United States Patent [19]

Dietzel et al.

[11] Patent Number: 4,907,326
[45] Date of Patent: Mar. 13, 1990

[54] SYSTEM FOR MANIPULATION OF SMALL-DIAMETER PIPES AND A PROCESSING DEVICE FOR VEHICULAR BRAKE, FUEL AND HYDRAULIC LINES

[75] Inventors: Hans-Ulrich Dietzel, St. Leon-Rot; Gernot Dolch, Heidelberg; Walter Müffke, Wiesenbach, all of Fed. Rep. of Germany

[73] Assignee: Mannesmann Aktiengesellschaft, Düsseldorf, Fed. Rep. of Germany

[21] Appl. No.: 146,082

[22] Filed: Jan. 20, 1988

[30] Foreign Application Priority Data

Jan. 21, 1987 [DE] Fed. Rep. of Germany ....... 3701556

[51] Int. Cl.⁴ .......................... B23Q 7/16; B23P 23/00
[52] U.S. Cl. ........................ 29/33 T; 29/237;
29/426.4; 29/434; 29/453; 29/809; 29/235;
29/450; 59/3; 206/390; 206/443; 414/745.1;
414/786
[58] Field of Search ............... 29/426.4, 430, 429,
29/434, 453, 450, 235, 809, 237, 33 T, 426.5, 33
K; 414/745.1, 786; 206/390, 443, 483; 59/3,
900; 248/74.2, 55; 53/591, 148

[56] References Cited

U.S. PATENT DOCUMENTS

| 2,803,176 | 8/1957 | Gazette | 29/33 T UX |
|---|---|---|---|
| 3,431,548 | 3/1969 | Busler | 206/390 X |
| 3,631,973 | 1/1972 | Rode | 206/443 X |
| 3,720,992 | 3/1973 | Hyatt | 29/430 |
| 3,874,048 | 4/1975 | Millar et al. | 29/430 |
| 3,904,020 | 9/1975 | Bohlmark | 414/745.1 X |
| 4,285,460 | 8/1981 | Clavin | 29/33 T X |
| 4,343,076 | 8/1982 | Ostapovitch | 29/426.5 |
| 4,442,577 | 4/1984 | Numano et al. | 29/33 T |
| 4,586,253 | 5/1986 | Souchi et al. | 29/237 X |
| 4,705,244 | 11/1987 | Saotome et al. | 248/74.2 |

FOREIGN PATENT DOCUMENTS 985375 3/1965 United Kingdom ............... 248/74.2

Primary Examiner—Charlie T. Moon
Attorney, Agent, or Firm—Horst M. Kasper

[57] ABSTRACT

In order to simplify, and to render easier, and to avoid manipulating difficulties of small-diameter pipes, which have to be separated and singled in the processing at a separating distance (6) and which have to be transported after the processing either within a factory or to different manufacturing or treatment stations or between factories, and in particular of pipes (1) with bulges present or to be applied at their ends, such as pipe-connection nuts (26), protective caps (27), it is disclosed that the pipes (1) are separated continuously with a fixed distance (6, 6a) in between the pipes and are disposed at such a distance in a direction parallel to their axis, and are further separated on a moving support (10). Then each pipe (1) is provided, during the continuous motion in a direction perpendicular to the pipe axis (1a), with a neighboring or with a more remote pipe in a parallel axial position by way of hinged disengageable connection members (12) which, in each case, correspond to the fixed distance (6, 6a) and wherein the pipe mat (19) of pipes (1) and hinged connections members (12) is continuously withdrawn and possibly wound to a bundle (20).

16 Claims, 2 Drawing Sheets

SYSTEM FOR MANIPULATION OF SMALL-DIAMETER PIPES AND A PROCESSING DEVICE FOR VEHICULAR BRAKE, FUEL AND HYDRAULIC LINES

BACKGROUND OF THE INVENTION

1. Field of the Invention

The invention relates to a method and to a device for the manipulating of small-diameter pipes, in particular for pipes with enlargements and bulges present or to be applied to their ends, such as pipe-connection nuts, where the bundle of pipes is transported in a direction perpendicular to their axis and furthermore the invention refers to a manufacturing apparatus and a treatment apparatus useful for brake, fuel, and hydraulic lines.

2. Brief Description of the Background of the Invention Including Prior Art

For many years, brake, fuel, and hydraulic lines are usually further treated in individual pieces since many years in successive, however locally separated, machines and apparatus, and are then delivered in bundles of up to 100 pieces to a user or, respectively, for further processing. It is disadvantageous in this context that within the manufacturing process, for example, in boxes and deposits, or during transport, there occur damages and undesired positions, i.e. a loss of space. The damages at the surface are particularly damaging to the corrosion-protective layers which have been applied at substantial cost. It is further possible that even deformations of the straight or already bent conduit lines occur.

Since such conduit line or pipe bundles are hard to handle as a whole bundle, these damages occur even before they are shipped. Furthermore, the conduit-line bundles, however, have to be separated again into individual pieces by the receiving factory plant. Most of these difficulties occur because the conduit lines are provided at their ends with bulges or enlargements, which include, on the one hand, protective caps for the preprocessed pipe end, which exhibits, for example, a deburred hole input or a deburred outer diameter, and which, on the other hand, consist of already applied enlargements, such as, for example, the pipe-connection nuts or the flanging rim edges coordinated to these pipe connection nuts. The brake, fuel, and hydraulic lines are therefore in general not of a uniform diameter at their ends.

SUMMARY OF THE INVENTION

1. Purposes of the Invention

It is an object of the present invention to provide a system which eliminates damages to pipes with a non-uniform end diameter during the processing and during the transport within as well as outside the factory, as well as between two factories.

It is yet another object of the invention to provide a system advantageous for the processing and transport of pipe sections.

It is yet another object of the present invention to connect pipes into larger units which can be more easily handled and which serve to provide protection against damage to the individual pipe members.

These and other objects and advantages of the present invention will become evident from the description which follows.

2. Brief Description of the Invention

The invention relates to a method for manipulation of small-diameter pipes for obtaining bundles of pipes to be transported in a cross-direction to the pipes. Pipes are fed from a supply of pipes to a separating station. The pipes are continuously separated into single pipe pieces in the separating station. The separated pipes ar disposed parallel to their respective axis at a fixed distance on a moving support. Each pipe is moved in a direction perpendicular to the pipe axis. Each pipe is provided with disengageable hinged connections, which correspond in their length in each case to the fixed distance between the pipes, where the pipes are disposed in parallel axial position with another pipe at a relatively small distance for forming a pipe mat. The pipe mat, comprising pipes and the hinged connections, is continuously withdrawn.

The bulging parts can be disposed at the ends of the pipes.

The pipe mat can be wound formed from individual small-diameter pipes and formed with hinged members to a connected bundle. The connected bundle can be transported to an additional processing station.

The invention also disclosed a device for processing of small-diameter pipes, in particular of pipes with bulges disposed or to be disposed at their ends. The transport means feeds a plurality of loose pipes. A separating device with separating elements is coordinated to the transport means for receiving loose pipes from the transport means for separating the loose pipes perpendicular to the longitudinal axis of the plurality of loose pipes. A separating means for pipes fed by the transport means includes separating elements set for fixed separation distances between the pipes. A feed device is disposed above the separated pipes for furnishing disengageable hinged members. A press-in device is disposed above the separated pipes for receiving the plurality of again disengageable hinged members for pressing the disengageable hinged members around respective pipes for formation of a pipe mat.

Processing stations can be disposed toward the pipe ends and can be disposed at a plurality of separating distances of at least one full separating distance of successively following pipes along a pipe mat. A production line can receive the pipe mat in a stretched position, where the straight pipe pieces can be hingedly connected to each other in cross-direction to each other. Transporting means can cyclically move the pipe mat in steps corresponding to the separation distances of the pipes.

The processing stations can be pipe modification stations. A processing station can be provided for the unwinding of the pipe mat from a bundle. A shearing-off device can be furnished for the removal of the hinged members in a vertical direction.

The pipes can be of a type used in connection with vehicular brakes, vehicular fuel, or vehicular hydraulic lines. The pipes can be transported in bundles by the transport means for production pipe mats. Transporting means can receive the pipes from the press-in means. A region of processing stations can receive the pipes from the press-in means for the phasing, and/or for the deburring, and/or for the sliding on of pipe-connection nuts, and/or for the flanging, and/or for the brushing, and/or for the testing of the pipes. A drivable winding drum or layer-deposit station for pipe mats is preferably disposed at the end of the processing line.

Preferably, bows made out of low-density materials are employed as the hinged members. The hinged members can be connected to each other corresponding to the processing separating distance of the separated and singled pipes and can include clamping-jaw pairs for the outer pipe diameter. The clamping jaw pairs can be connected to each other by a thin elastic web.

The hinged members can form bows made out of a low-density material, which can exhibit, corresponding to the transport separation distance of the individualized and singled pipes, clamping-jaw pairs for the outer-pipe diameter. The clamping jaws can be connected to each other by way of a trapezoidal thin elastic web.

In accordance with the invention, the pipes are disposed parallel to the axis and are separated continuously at a fixed distance on a moving support and then each pipe is provided, during the continuous motion perpendicular to the pipe axis, with the neighboring or with a more remote pipe in parallel axial position by way of hinged, disengageable connections, which connections, in each case, correspond to the fixed distance between the pipes, and wherein the pipe mat, made up of the pipes and the hinged connections, is continuously withdrawn. This pipe mat supports the individual pipes during the processing and during the transport at a distance and thus avoids damages and saves at the same time a multiple picking up, positioning, and renewed depositing of the individual pipes.

The apparatus for performing the method includes that at least one pick-up for at least one bundle of loose pipes is provided, that a separating device with separating elements, adjusted for fixed separating distances, follows perpendicular to the longitudinal axis of the bundle, that at least one feed device and one press-in device for a plurality of again disengageable hinged members for forming of a pipe mat are disposed above the individualized or singled pipes. Such a separating device can automatically be fed and operates automatically such that pipe mats of any desired length can be produced. In addition, the hinged members have an unlimited use and can therefore be used again and again and fed to the pipe-mat device.

The invention further allows the application of the pipe mat, formed by individual small-diameter pipes with or without pipe-screw sections, and with hinged members, which is wound to a continuous bundle for transport to further processing plants. Such pipe-mat winding bundles can be advantageous for the transport and for a further processing, where the transport means and the further processing can be tuned and adapted to corresponding pipe-mat winding-bundle diameters or vice versa.

Damages and transport problems are further avoided by having the straight pipe pieces hingedly connected to each other in cross direction of the pipes at a preset separation distance and such as to form together with the hinged members a pipe mat. The pipe mat is guided in a stretched position in a processing line, wherein processing stations, facing the pipe ends, are disposed in a plurality of separating distances of at least one full separating distance following to each other. The pipe mat is guided in a stretched configuration in a processing line and the pipe mat is movable in steps on the separation sections in a cyclical way with a cycle corresponding to a separation distance. This production apparatus increases in addition the production capacity of such products.

According to a feature of the invention, it is disclosed that processing stations are provided for a phasing of the pipe ends, and/or for a deburring of the pipe ends, and/or for a sliding on of pipe-connection nuts, and/or for a flanging, and/or for a brushing of the pipe ends, and/or for a testing of the pipes, and/or for depositing the pipe ends with protective agents. In this way, the essential processing steps can be taken in order to produce an at least partially finished conduit pipe, which can then be processed to pipe mats or, respectively, winding bundles.

It is further disclosed for this alternative embodiment that a processing station for the bending of the individualized and singled pipes is provided. Essentially, the bending is employed as a last processing step before the assembly of the conduit pipes at a motor vehicle.

It is advantageous for a continuous production of the pipes up to the assembly stage in an automobile, if there is provided a processing station for the unwinding of the pipe mat from a bundle with a shear-off device for the removal of the hinged members in vertical direction.

A further feature of the invention discloses that the production of the pipes is brought into a closer vicinity of the assembly of the motor vehicles by providing a press-in and force-in device for the connecting of the individual pipes with hinged members for the brake, fuel, or hydraulic lines followed by a separating device and followed by a region for the processing stations for the phasing in, and/or for the deburring, and/or for the sliding on of pipe-connection nuts, and/or for the flanging, and/or for the brushing, and/or for the testing of the pipes, and that, at the end of the processing line, there is disposed a drivable winding drum or a layer-deposit station for pipe mats.

A pipe-modifying station is a station which provides for a phasing of the pipe ends, and/or for a deburring of the pipe ends, and/or for a sliding on of pipe-connection nuts, and/or for a flanging of the pipe ends, and/or for a brushing of the pipe ends, and/or for a testing of the pipes, and/or for bending of a separated single pipe.

Depending on whether the pipes are required to be still used in the processing or whether they are already fed to an assembly plant, it is disclosed for the first phase that the hinged members are formed as bows, made out of low-density materials, which exhibit, corresponding to the processing separating distance of the individualized or singled pipes, clamping-jaw pairs for the outer-pipe diameter, which clamping jaws are connected to each other by way of a thin elastic web.

In contrast, advantages result for the transport, i.e. for a proper space use in pipe-mat layers or for pipe-mat wound bundles, where the hinged members form bows, made out of low-density materials, which exhibit clamping-jaw pairs for the outer-pipe diameter corresponding to a transport separation distance of the individualized or singled pipes, which clamping-jaw pairs are connected to each other by way of a trapezoidal thin elastic web.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

Embodiments according to the invention are schematically represented in the drawings and are illustrated in the following.

DESCRIPTION OF INVENTION AND PREFERRED EMBODIMENT

Figure 1:
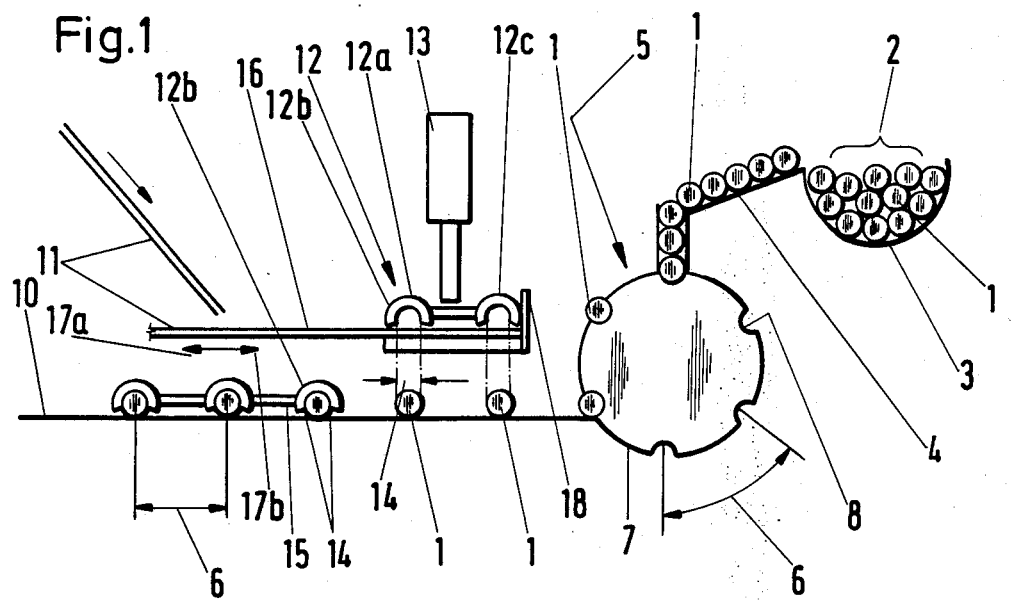
FIG. 1 is a side view of a device for manipulating of small-caliber pipes.

The invention discloses a device for manipulation of small-diameter pipes, in particular of pipes with bulges disposed or to be disposed at their ends. The improvement comprising that at least a bundle 2 of loose pipes 1 is provided for a receiving station 3. An individualizing or separating device 5 with separating elements 8 follows perpendicular to the longitudinal axis 1a of the bundle 2. These separating elements 8 are set for fixed separation distances 6. At least one feed device 11 and one press-in device 13 is provided above the separated pipes 1 and for a plurality of again disengageable hinged members 12 for formation of a pipe mat 19.

Preferably, processing stations 22, 23, disposed toward the pipe ends 1b, are disposed at a plurality of separating distances 6 of at least one full separating distance 6 of successively following pipes 1 along a pipe mat 19, which is in stretched position fed to a production line 21. The straight pipe pieces 1, which are hingedly connected to each other in cross-direction 9 to each other can form with the hinged members 12 a pipe mat 19. The pipe mat 19 can be cyclically movable in steps corresponding to the separation distances 6.

Preferably, the processing stations 22, 23 are provided for a phasing of the pipe ends 1b, and/or for a deburring of the pipe ends 1b, and/or for a sliding on of pipe-connection nuts, and/or for a flanging of the pipe ends 1b, and/or for a brushing of the pipe ends 1b, and/or for a testing of the pipes 1.

A processing station 22, 23 can be provided for the bending of the separated single pipes 1.

A processing station 22, 23 can be furnished for the unwinding of the pipe mat 19 from a bundle 20. A shear-off device 24 can be provided for the removal of the hinged members 12 in a vertical direction.

Preferably, brake, fuel, or hydraulic lines, transported in bundles 20 for pipe mats 19, are subsequently fed to a separating device 5 and then to a region of processing stations 22, 23 for the phasing, and/or for the deburring, and/or for the sliding on of pipe-connection nuts, and/or for the flanging, and/or for the brushing, and/or for the testing of the pipes 1. A press-in device 13 can be provided for the connection of the individual pipes 1 with hinged members 12. A drivable winding drum 25 or a layer-deposit station for pipe mats 19 can be disposed at the end of the processing line 21.

The hinged members 12 can form bows 12a and can be made out of low-density materials. These hinged members can be connected to each other corresponding to the processing separating distance 6 of the separated and singled pipes 1 and can exhibit clamping-jaw pairs 12b, 12c for the outer pipe diameter 14. The clamping-jaw pairs 12b, 12c can be connected to each other by a thin elastic web 12d.

The hinged members 12 can form bows 12a and can be made out of a low-density material, which can exhibit, corresponding to the transport separation distance 6a of the individualized and singled pipes 1, clamping-jaw pairs 12b, 12c for the outer-pipe diameter 14. The clamping-jaw pairs 12b, 12c can be connected to each other by way of a trapezoidal thin elastic web 12d.

The invention discloses a method for manipulation of small-diameter pipes, in particular of pipes with bulges disposed or to be disposed at their ends, where bundles of pipes have to be transported in cross-direction to the pipes. The improvement comprises that the pipes are continuously separated into single pieces and are disposed parallel to their axis at a continuous fixed distance on a moving support. Each pipe, during the continuous motion perpendicular to the pipe axis, is provided with disengageable hinged connections, which correspond in each case to the fixed distance between the pipes. The pipes are disposed in parallel axial position with the neighboring or with a more remote pipe. The pipe mat, comprising pipes and the hinged connections, is continuously withdrawn.

The pipe mat 19 formed from individual small-diameter pipes 1, with or without pipe screw connections, can be formed with hinged members 12. The pipe mat 19 can be wound to a connected bundle 20, adapted to be transported to additional processing stations.

The manipulation of small-caliber or small-diameter pipes, which are frequently made out of steel with several protective layers inhibiting corrosion or, depending on the purpose of use, for example as fuel, brake, or hydraulic lines, are made of plastic materials, depending on the length, the intended bendings, and the terminating means, which are provided for a pipe-end processing where, for example, also bulges and enlargements of the pipe end are required. Correspondingly, such pipe sections, which are called pipes 1 for short, are unwieldy and difficult to transport. The transport between processing stations within a factory and also outside of a factory between remote factories has to be considered in this context.

The pipes 1 are placed in bundles 2 into a receiving station 3 and are fed from there via a magazine feed 4 to a separating device 5, which separates the pipes 1 into a fixed separation distance 6. A magazine wheel 7 serves here as a separating device 5, which provides separating elements 8 at equal separating distances 6, which separating elements 8 are formed as a trough for a pipe 1. In addition, chain pairs with chain wheels, not illustrated in detail here, can serve as separating device, which chain pairs would receive the pipes 1 by means of holders disposed at a distance of the chain links and which holders would serve as separating elements 8.

The pipes 1 move successively in a direction perpendicular to the pipe axis 1a, i.e. in cross-section 9 on a continuously moving support 10 and pass at equal separating distances 6 through a processing line, which can exhibit the desired provisions for treating of the pipe ends 1b.

Initially, the feed device 11 is provided, according to the embodiment of FIG. 1, for individual hinged members 12 as well as for a press-in device 13. The hinged members 12 are formed of light-weight and/or low-density materials, such as plastic and/or aluminum alloys, and are formed as bows 12a, which comprise clamping-jaw pairs 12b and 12c having a distance which corresponds to the separating distance 6 of the individualized or singled pipes 1, where the clamping-jaw pairs are adapted to the outer-pipe diameter 14, and where a spring force is formed, which allows to effect a sufficiently solid and strong gripping of the pipes 1 which, however, also enable a disengagement of the hinged members 12 from the pipes. The hinged members 12 surround with the clamping-jaw pairs 12b and 12c either neighboring pipes 1 or more distant pipes 1. The selection of the length of the web 15 therefore is determined an X-multiple of the separating distance 6. The feeding of the hinged members 12 is performed via back and forth motions of a magazine slide 16 in the direction 17a and 17b against a limit stop 18.

Figure 2:
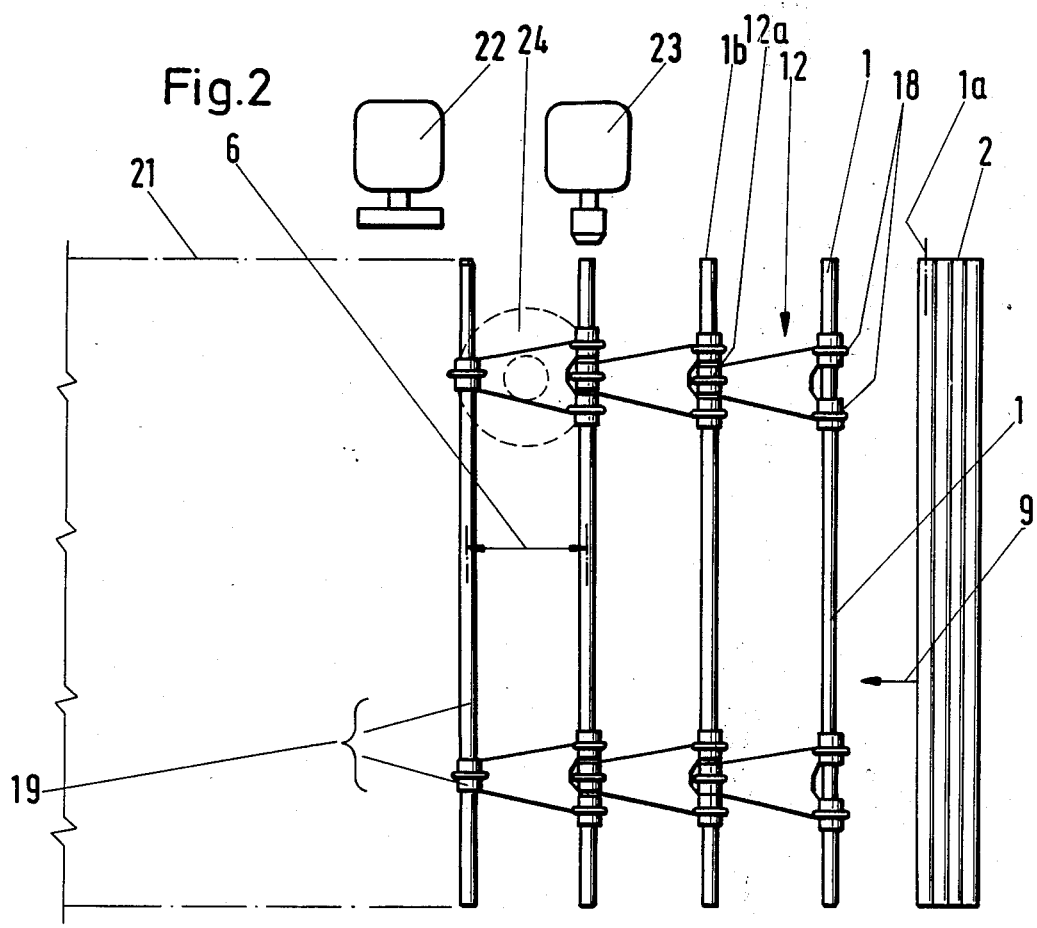
FIG. 2 is a view of the pipe mat formed according to the device of FIG. 1 as seen from the top, with processing stations of a processing line.

The formation of the clamping-jaw pairs 12b, 12c in addition can be gathered from FIG. 2, which illustrates a one-side fork shape 18. Upon advancing motion in cross-section 9, there is generated a pipe mat 19 which can be continuously withdrawn.

This pipe mat 19 can contain finished, semi-finished, and also only cut, straight pipes 1. The pipe mat 19 can therefore be considered as a preparation for a transport between two processing lines, as an advantageous preparation for further processing steps, or as a preparation for the transport between remote factories. A transport shape of the pipe mat 19 comprises a wound bundle 20, as illustrated in FIG. 3.

The bundle 20 or also the flat extended pipe mat 19 can be treated in a processing device in a corresponding fashion, as illustrated in FIG. 2. For this purpose, the processing line 21 is indicated. Processing stations 22 and 23 are disposed toward the pipe ends 1b and these processing stations 22 and 23 can treat or process the pipe ends 1b in any desired fashion. The pipe mat 19 is cyclically moved in distances corresponding to the separating distances 6 such that each pipe end 1b passes in front of each processing station 22 or 23. The pipe end 1b can be deburred, can be phased in, can be prepared for the sliding on of pipe-connection nuts 26 at such processing stations 22, 23. In addition, the pipe end 1b can be flanged, can be brushed, and can be tested. A particular processing station can be provided for the bending of the pipes 1. In addition, at the beginning, a processing station for the unwinding of the pipe mat 19 from the bundle 20 can be provided within such a processing line 21.

The pipes 1 can be treated individually by providing a processing station as a shear-off device 24 for the vertical removal of the hinged members 12, which hinged members can be either collected or can be fed to the later processing for the formation of new pipe mats 19.

Figure 3:
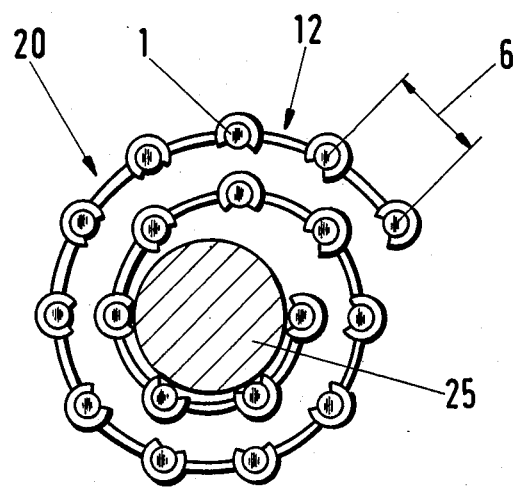
FIG. 3 is a view of a wound pipe-mat bundle as seen from the side.

The processing line 21 can also be formed such as illustrated in FIGS. 1 to 3 in that, following to a separating device 5 and following to a region for the processing stations 22, 23 for the phase in, for the deburring, for the sliding on of pipe-connection nuts, for the flanging, for the brushing, or for the testing, there is provided a press-in device 13 for a renewed connection of the individualized and singled pipes with hinged members 12 such that, at the end of the processing line 21, the pipe mat 19 is again wound, by way of a winding drum 25, to a bundle 20. The winding and the unwinding of the pipe mat 19 depends only on the form of the finished pipe 1, where in general one starts with the consideration that a pipe delivered in a pipe mat 19, which forms a wound bundle 20, only has to be rolled off and then the fittings have to be inserted upon a corresponding preparation of the pipe ends 1b and then the pipes 1 are prepared individually in a bending station. However, it is of course also possible to join the pipes 1, between the individual processing lines of the most different kind, in each case, again to pipe mats 19 and to feed these pipe mats 19 either flat to a further processing or to place these pipe mats 19 into wound bundles 20.

An adaptation of the hinged members 12 is provided for all application possibilities. The pipes 1 are disposed, according to FIG. 4, within a pipe mat 19 at a production separating distance 6. This distance is, on the one hand, determined by the distance of the processing stations 22, 23 in the processing line 21 and, on the other hand, by the pipe-connection nuts 26 or, respectively, by the protective caps 27 present in most cases. The hinged members 12 are then determined by the shape of the bow 12a overall or, respectively, by the clamping-jaw pairs 12b, 12c together with the web 12d. Advantageously, the hinge effect is achieved here by springingly expandable clamping jaws 12b and 12c, which exhibit a somewhat extended half-shell shape, such that the outer diameter 14 of a pipe 1 is surrounded over a circumference of somewhat more than 180 degrees. Advantageously, two clamping jaws 12c form on one and the same pipe 1, together with only one clamping jaw 12b on the neighboring pipe 1, a bow 12a such that there occurs a gripping into each other of bow 12a relative to bow 12a. This allows to save substantial space.

Figure 4:
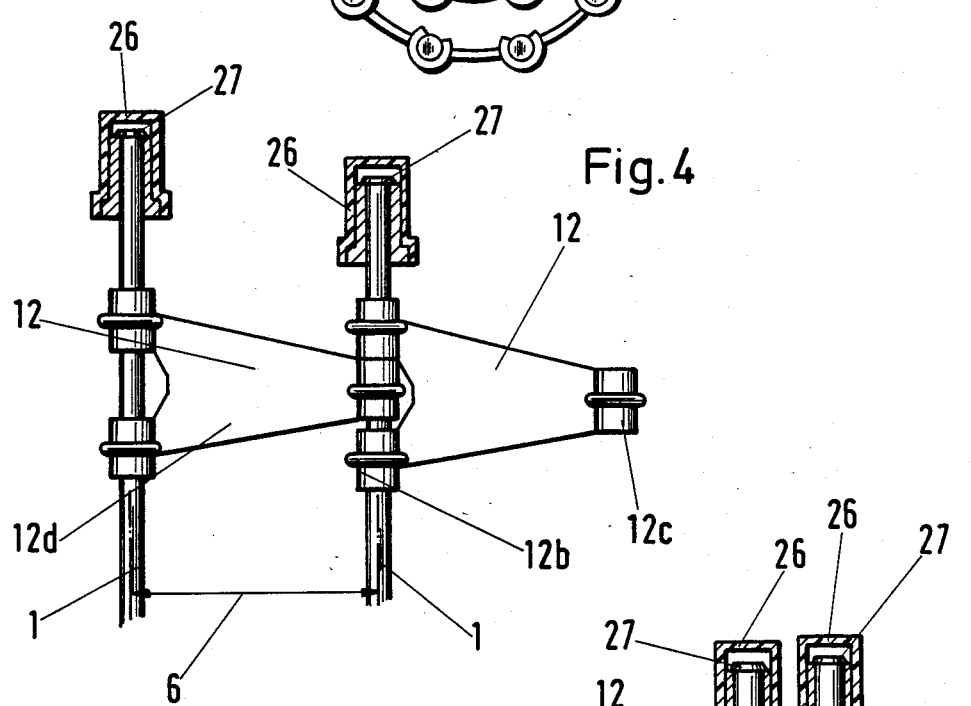
FIG. 4 is a plan view onto a section of a pipe mat, wherein the pipes are disposed at a processing separation distance.
Figure 5:
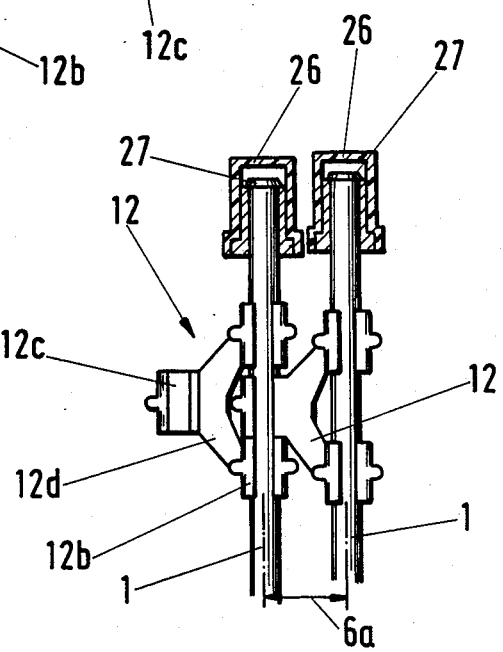
FIG. 5 is a top plan view onto a pipe mat, similar to that of FIG. 4, however with a transport separation distance.

The disposition of the bows 12a, according to FIG. 5, is provided substantially and to a large extent as described in FIG. 4. The sense of the recited transport separating distance 6a is different and consequently the form of the about trapezoidal, thin, elastic web 12d, made of thermoplastic plastic materials, is different. The formation of the web 12d, i.e. the trapezoidal height, depends on the situation of the pipe mat 19, where such a pipe mat can be destined to be received in rectangular containers in layers by a layer-positioning station. The pipe mat 19 is in such situations layered in back and forth sequence.

The clamping jaws can have an angle of from about 190 to 270 degrees, and preferably have an angle of from about 200 to 230 degrees over which they surround the pipe. The outer diameter of a clamping jaw surrounding the pipe can be from about 1.5 to 3.0 times the outer diameter of the pipe and is preferably from about 1.7 to 2.2 times the outer diameter of the pipe. The axial length of an individual clamping jaw can be from about 1 to 5 times the diameter of the pipe and is preferably from about 2 to 4 times the diameter of the pipe. The clamping jaw can be provided with a stiffening outside surrounding ridge, where such ridge has a diameter which corresponds to about 1.3 to 1.7, and preferably from about 1.35 to 1.5, times the outside diameter of the clamping jaw. Preferably, the ridge is disposed such that it forms essentially a symmetry plane for the two axial end parts of the clamping jaw. Preferably, the web formed between two clamping jaws on a first pipe and a single clamping jaw on a second pipe run from about the axial ends of the single clamping jaw to the area of the ridge of the two axially aligned clamping jaws. The web in the section between the two aligned clamping jaws does not follow a straight line between the connection points of the web and the edge of the clamping jaw, but there is a cut-out recess in the web which is adapted to allow a single clamping jaw together with this ridge to be placed between the two aligned clamping jaws and preferably such that there is a clearance between the ridge and the web which corresponds to about at least the radial thickness of the ridge as disposed on the outer diameter of the clamping jaw. The distance between the closest sections of the aligned clamping jaws can be from about 1.1 to 1.5 times the axial length of a single clamping jaw and is preferably from about 1.2 to 1.4 of the length of a single clamping jaw. The angle of the trapezoidal-shaped web joining three clamping jaws depends on the distance preferred for the spacing of the pipes. A preferred angle can be from about 40 to 80 degrees for the edges of the web versus the axial direction of the pipe to be clamped. The thickness of the web preferably is from about 0.5 to 1.5 the radial thickness of the clamping jaw itself. The clamping jaws together with the web are preferably produced as a single molded part, for example by injection molding. While the material for the clamping jaws and the web can be provided by a variety of compositions, it is important that these materials exhibit sufficient elastic properties. If the basic material for these clamping jaws and webs is harder than the material from which the pipes are formed, then preferably a coating or a layer of a material is provided which has a lower hardness than the pipes to be managed in order to avoid accidental damaging of the pipe by the clamping jaws.

It will be understood that each of the elements described above, or two or more together, may also find a useful application in other types of processes and devices for the manipulation of small-caliber pipes differing from the types described above.

While the invention has been illustrated and described as embodied in the context of system for manipulation of small-diameter pipes and a processing device for brake, fuel, and hydraulic lines for motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Device for processing of small-diameter pipes, in particular of pipes with bulges disposed or to be disposed at their ends comprising
    transport means for feeding a plurality of loose pipes;
    a separating device with separating elements coordinated to the transport means for receiving loose pipes from the transport means for separating the loose pipes perpendicular to the longitudinal axis of the plurality of loose pipes, a separating means for pipes fed by the transport means where the separating means includes separating elements set for fixed separation distances between the pipes; transport means for cyclically moving the fixed distance separated pipes from said separating means to a hinge assembling location;
    a feed device disposed above the separated pipes for furnishing disengageable hinged members;
    a press-in device disposed above the separated pipes for receiving the plurality of again disengageable hinged members and for pressing the disengageable hinged members around respective pipes for formation of a pipe mat.

2. Device for processing of small-diameter pipes according to claim 1 further comprising processing stations disposed toward the pipe ends and disposed at a plurality of separating distances of at least one full separating distance of successively following pipes along a pipe mat, a production line receiving the pipe mat in a stretched position, where the straight pipe pieces are hingedly connected to each other in cross-direction to each other and winding the pipe mat into a coiled bundle;
    transporting means for cyclically moving the pipe mat in steps corresponding to the separation distances of the pipes.

3. Device for processing of small-diameter pipes according to claim 2 wherein
    the processing stations are pipe modification stations.

4. Device for processing of small-diameter pipes according to claim 2 wherein a processing station is provided for the unwinding of the pipe mat from a bundle; and further comprising
    a shearin-off device for the removal of the hinged members in a vertical direction.

5. Device for processing of small-diameter pipes according to claim 1 wherein the pipes are of a type used in connection with vehicular brakes, vehicular fuel, or vehicular hydraulic lines, wherein the pipes are transported in bundles by the transport means for production pipe mats;
    transporting means receiving the pipes from the press-in means;
    a region of processing stations receiving the pipes from the press-in means for the phasing, and/or for the deburring, and/or for the sliding on of pipe-connection nuts, and/or for the flanging, and/or for the brushing, and/or for the testing of the pipes; and
    a drivable winding drum or layer-deposit station for pipe mats disposed at the end of the processing line.

6. Device for processing of small-diameter pipes according to claim 5 wherein
    bows made out of low-density materials are employed as the hinged members, where the hinged members are connected to each other corresponding to the processing separating distance of the separated and singled pipes and where the hinged members include clamping-jaw pairs for the outer pipe diameter which are connected to each other by a thin elastic web.

7. Device for processing of small-diameter pipes according to claim 5 wherein
    the hinged members form bows made out of a low-density material, which exhibit, corresponding to the transport separation distance of the individualized and singled pipes, clamping-jaw pairs for the outer-pipe diameter, which clamping jaws are connected to each other by way of a trapezoidal thin elastic web.

8. Device for manipulation of small-diameter pipes, in particular of pipes with bulges disposed or to be disposed at their ends, the improvement comprising a receiving station a bundle (2) of loose pipes (1); means for feeding pipes to an individualizing or separating device (5) with separating elements (8) follows, perpendicular to the longitudinal axis (1a) of the bundle (2), which separating elements (8) are set for fixed separation distances (6) between the pipes; transport means for cyclically moving the fixed distance separated pipes from said separating means to a hinge assembling location; at least one feed device (11) and one press-in device (13) above the separated pipes (1) and for a plurality of engageable and again disengageable hinged members (12) around said fixed distance separated pipes for formation of a pipe mat (19).

9. Device for manipulation of small-diameter pipes according to claim 8 wherein processing stations (22, 23), disposed toward the pipe ends (1b), are disposed at a plurality of separating distances (6) of at least one full separating distance (6) of successively following pipes (1) along a pipe mat (19), which is in stretched position fed to a production line (21), where the straight pipe pieces (1), which are hingedly connected to each other in cross-direction (9) to each other and which form with the hinged members (12) a pipe mat (19); and transporting means for cyclically moving the pipe mat in steps corresponding to the separation distances (6).

10. Device for manipulation of small-diameter pipes according to claim 9 wherein the processing stations (22, 23) are provided for a phasing of the pipe ends (1b), and/or for a deburring of the pipe ends (1b), and/or for a sliding on of pipe-connection nuts, and/or for a flanging of the pipe ends (1b) and/or for a brushing of the pipe ends (1b), and/or for a testing of the pipes (1).

11. Device for manipulation of small-diameter pipes according to claim 9 wherein a processing station (22, 23) is provided for the bending of the separated single pipes (1).

12. Device for manipulation of small-diameter pipes according to claim 9, further including means for winding said pipe mat into a coiled bundle.

13. Device for manipulation of small-diameter pipes according to claim 12 further comprising a processing station (22, 23) furnished for the unwinding of the pipe mat (19) from a bundle (20), and a shearing-off device (24) is provided for the removal of the hinged members (12) in a vertical direction.

14. Device for manipulation of small-diameter pipes according to claim 9 wherein
brake, fuel, or hydraulic lines, transported in bundles (20) for pipe mats (19), are subsequently fed to a separating device (5) and then to a region of processing stations (22, 23) for the phasing, and/or for the deburring, and/or for the sliding on of pipe-connection nuts, and/or for the flanging, and/or for the brushing, and/or for the testing of the pipes (1), a press-in device (13) for the connection of the individual pipes (1) with hinged members (12), and wherein a drivable winding drum (25) or a layer-deposit station for pipe mats (19) is disposed at the end of the processing line (21).

15. Device for manipulation of small-diameter pipes according to claim 8 wherein
the hinged members (12) form bows (12a) are made out of low-density materials, which hinged members are connected to each other corresponding to the processing separating distance (6) of the separated and singled pipes (1) and exhibit clamping-jaw pairs (12b, 12c) for the outer pipe diameter (14), which are connected to each other by a thin elastic web (12d).

16. Device for manipulation of small-diameter pipes according to claim 8, wherein
the hinged members (12) form bows (12a) made out of a low-density material, which exhibit, corresponding to the transport separation distance (6a) of the individualized and singled pipes (1), clamping-jaw pairs (12b, 12c) for the outer-pipe diameter (14), which are connected to each other by way of a trapezoidal thin elastic web (12d).

* * * * *